(12) United States Patent
Pedersen (10) Patent No.: US 9,144,863 B2
(45) Date of Patent: Sep. 29, 2015

(54) SYSTEM AND METHOD FOR HANDLING WIND TURBINE TOWER SECTIONS

(75) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 221 days.

(21) Appl. No.: 13/807,115

(22) PCT Filed: Jun. 29, 2011

(86) PCT No.: PCT/DK2011/050247
§ 371 (c)(1),
(2), (4) Date: Dec. 27, 2012

(87) PCT Pub. No.: WO2012/003831
PCT Pub. Date: Jan. 12, 2012

(65) Prior Publication Data
US 2013/0104376 A1 May 2, 2013

Related U.S. Application Data

(60) Provisional application No. 61/361,939, filed on Jul. 7, 2010.

(30) Foreign Application Priority Data

Jul. 7, 2010 (DK) .................................. 2010 70317

(51) Int. Cl.
*B25B 11/00* (2006.01)
*F03D 11/00* (2006.01)
*B23P 11/00* (2006.01)
*F03D 1/00* (2006.01)

(52) U.S. Cl.
CPC ................. *B23P 11/00* (2013.01); *B25B 11/00* (2013.01); *F03D 1/005* (2013.01); *F03D 11/00* (2013.01); *Y02E 10/722* (2013.01); *Y10T 29/49948* (2015.01); *Y10T 29/49998* (2015.01)

(58) Field of Classification Search
CPC ....... B25B 11/00; E04H 12/34; E04H 12/344; F03D 1/005; Y02E 10/722; Y10T 29/49998

USPC .................. 29/525.01, 525.02, 559; 410/44; 269/296

See application file for complete search history.

(56) References Cited

U.S. PATENT DOCUMENTS

| 5,641,261 | A | * | 6/1997 | Talbert et al. ................. 414/544 |
| 2009/0280010 | A1 | | 11/2009 | Pederson |
| 2009/0304475 | A1 | * | 12/2009 | Wessel et al. .................... 410/44 |

FOREIGN PATENT DOCUMENTS

| EP | 2 159 412 | | 3/2010 |
| EP | 2381103 | A1 * | 10/2011 |
| ES | 2 317 715 | | 4/2009 |
| WO | 2007/093854 | | 8/2007 |

OTHER PUBLICATIONS

Marcin Król; International Search Report and Written Opinion issued in priority International Application No. PCT/DK2011/050247; Feb. 14, 2012; 10 pages; European Patent Office.

Jan Sørensen; !st Technical Examination and Search Report issued in priority Denmark Application No. PA 2010 70317; Feb. 18, 2011; 6 pages; Denmark Patent and Trademark Office.

* cited by examiner

*Primary Examiner* — Jermie Cozart
(74) *Attorney, Agent, or Firm* — Wood, Herron & Evans, LLP (57) ABSTRACT

A system and method for handling a wind turbine tower section generally includes a fixture that supports an end of the tower section in a substantially horizontal orientation. The fixture includes a plurality of adaptor holes. A corresponding number of inserts are positioned within the adaptor holes. Each of the inserts include at least one bolt hole aligned with a bolt hole in a flange of the tower section when positioned in the corresponding adaptor hole. This allows the fixture to be secured to the tower section by bolting the inserts to the flange. The fixture can then be used as a storage foot, a lifting point, a lashing point to a truck, railcar, or vessel, or in other ways to handle the tower section.

20 Claims, 6 Drawing Sheets

SYSTEM AND METHOD FOR HANDLING WIND TURBINE TOWER SECTIONS

TECHNICAL FIELD

The present invention relates to handling wind turbine components, and more specifically to systems and methods for handling wind turbine tower sections.

BACKGROUND

Wind turbines have long been used to convert the kinetic energy of wind into mechanical energy that drives a generator, thereby producing electricity. Over time, there has been a significant increase in the overall size of these machines because of the desire to capture more of the wind's available energy. Nevertheless, there remain sites better suited for smaller wind turbines due to their wind conditions, local restrictions, or other limiting factors. A great variety of wind turbine sizes now exist as a result, which makes handling their components very challenging particularly in terms of transportation and storage.

For example, many wind turbine towers are assembled from annular sections of rolled steel. The sections are welded together at a factory to form cylindrical or conical tubes. The tubular sections are then transported to the intended wind turbine site and joined together by flange connections provided on their ends. The size of these components varies depending on the size of the particular tower being built and their location within that tower. Diameters, for example, may range from approximately 2 to 5 meters. Additionally, the intended sites are often located far away from the tower factories, meaning that the tower sections are often handled several times before reaching the sites. The handling could be unloading from a transportation vehicle to storage (or vice-versa), the transfer from one form of transportation to another (e.g., land to sea), etc.

WO 2007/093854 discloses one solution to address these challenges. The solution involves a tower stacking system having a fixture ("foot") that can be mounted to an end of a tower section at a manufacturing site. The fixture can remain fixed to the tower section until the intended site of the wind turbine, facilitating the various handling steps along the way. To accommodate different sizes of tower sections, the fixture incorporates sloped surfaces to guide the tower section towards the fixture's center when placed thereon. A central locking element can be moved vertically to match up with the resting place of the tower flange relative to the sloped surfaces. Locking elements on each side of the central locking element are also adjustable to match up with the tower flange. Eventually the locking elements are each secured to the tower flange.

The locking elements in the '854 application are shown as disc-like elements whose movements are guided by slots in the fixture. Each can be bolted to the tower section when a hole through them is aligned with a bolt hole in the flange of the tower section. But the '854 application also mentions the possibility of using clamps to connect to the tower section. Indeed, WO 2010/012280 discloses one embodiment of this principle. The locking elements in that application are movable clamps that grip the tower flange.

Although this type of solution has proven satisfactory for some purposes, wind turbine manufactures are still seeking new ways to address the above-mentioned challenges to further improve handling and reduce costs.

SUMMARY

A system for handling a wind turbine tower section is described below. The system generally includes a fixture having a base portion, abutment portion, and adaptor holes. The base portion is configured to stabilize the fixture on a surface. The abutment portion extends upwardly from the base portion and is configured to face an end of the tower section. The adaptor holes extend through the abutment portion. The system also includes a plurality of inserts positioned and retained in the plurality of adaptor holes. Each of the inserts includes one or more bolt holes arranged along a radius of curvature corresponding to that of bolt holes in a flange on the end of the tower section. In this way, the bolt holes in the inserts are configured to be aligned with the bolt holes in the flange of the tower section so that the fixture can be bolted to the end of the tower section.

With such a construction, the system can easily be used to handle various sizes of tower sections without significant reconfiguration. All that is needed is different sets of inserts with bolt holes arranged along different radii of curvature. The different sets of inserts may also have different bolt hole patterns, such as single and double rows of bolt holes, to further accommodate different flange designs.

A method using this system is also described. In general, the method comprises positioning a tower section in a substantially horizontal orientation and positioning a first fixture from the system against a first end of the tower section. An appropriate number of the inserts are then positioned in the adaptor holes of the first fixture. As mentioned above, the inserts are selected such that they each include one or more bolt holes aligned with the bolt holes in the flange of the tower section. Finally, the first fixture is secured to the first end of the tower section by bolting the adaptors to the flange. A second fixture may be secured to a second end of the tower section in a similar manner.

Such a system and method may facilitate all types of handling operations (transportation, storage, etc.). It is even possible for the system to be secured to a tower section at the factory where the tower section is manufactured and not removed until the tower section is at the intended site of installation. The system allows all necessary operations to be performed without damaging or deforming the tower sections.

In one particular aspect or embodiment, the system includes additional components to function as a "jacking" system. The additional components associated with each fixture are first and second brackets secured to first and second sides of the fixture, and first and second lifting devices secured to the respective first and second brackets. The lifting devices each include hydraulic cylinders. Accordingly, when the first and second fixtures are secured to a tower section and provided with these additional components, the lifting devices may be operated to raise the tower section while maintaining it in a horizontal orientation. This enables the tower section to be easily loaded onto or off a trailer (e.g., of a truck), as it is possible to move the trailer under (when loading) or out-from-under (when unloading) the tower section after it has been raised. The trailer may even be moved via a space between the first and second lifting devices of one of the fixtures.

These increased capabilities of the system will be described in further detail below along with other aspects and advantages.

DETAILED DESCRIPTION

Figure 1:
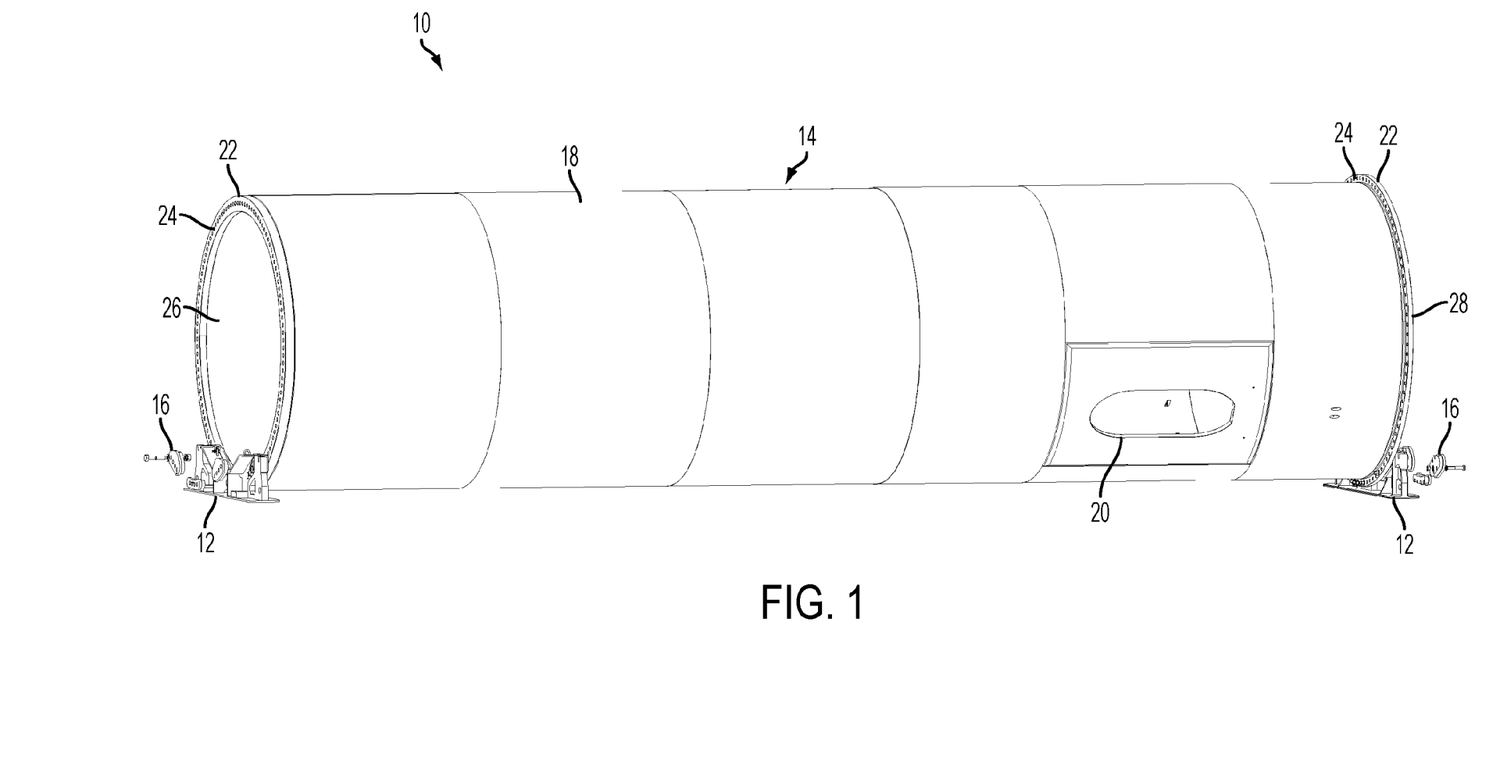
FIG. 1 is a perspective view of one embodiment of a system for handling wind turbine towers.

FIG. 1 shows one embodiment of a system 10 for handling wind turbine towers. In general, the system 10 includes one or more fixtures 12 (or "feet") for supporting a tower section 14 on a surface and inserts 16 used to help secure the fixtures 12 to the tower section 14. These components and additional capabilities of the system 10 will be described in further detail below. The details of the tower section 14 will also be described, but only for background purposes as the system 10 may be used to handle other tower sections and other types of towers.

The tower section 14 is shown as the bottom section of a tubular steel tower. Such a tower section may be constructed from several steel rings 18 welded together, with one of the rings accommodating a door 20. Flanges 22 with bolt holes 24 are provided on first and second ends 26, 28 of the tower section 14 to facilitate attachment to other tower sections or to a foundation. In this embodiment, the tower section 14 is slightly conical such that the flange 22 on the first end 26 extends along a first radius of curvature and the flange 22 on the second end 28 extends along a second radius of curvature. The tower section 14 may alternatively be cylindrical with both flanges 22 extending along similar radii of curvature.

Figure 2:
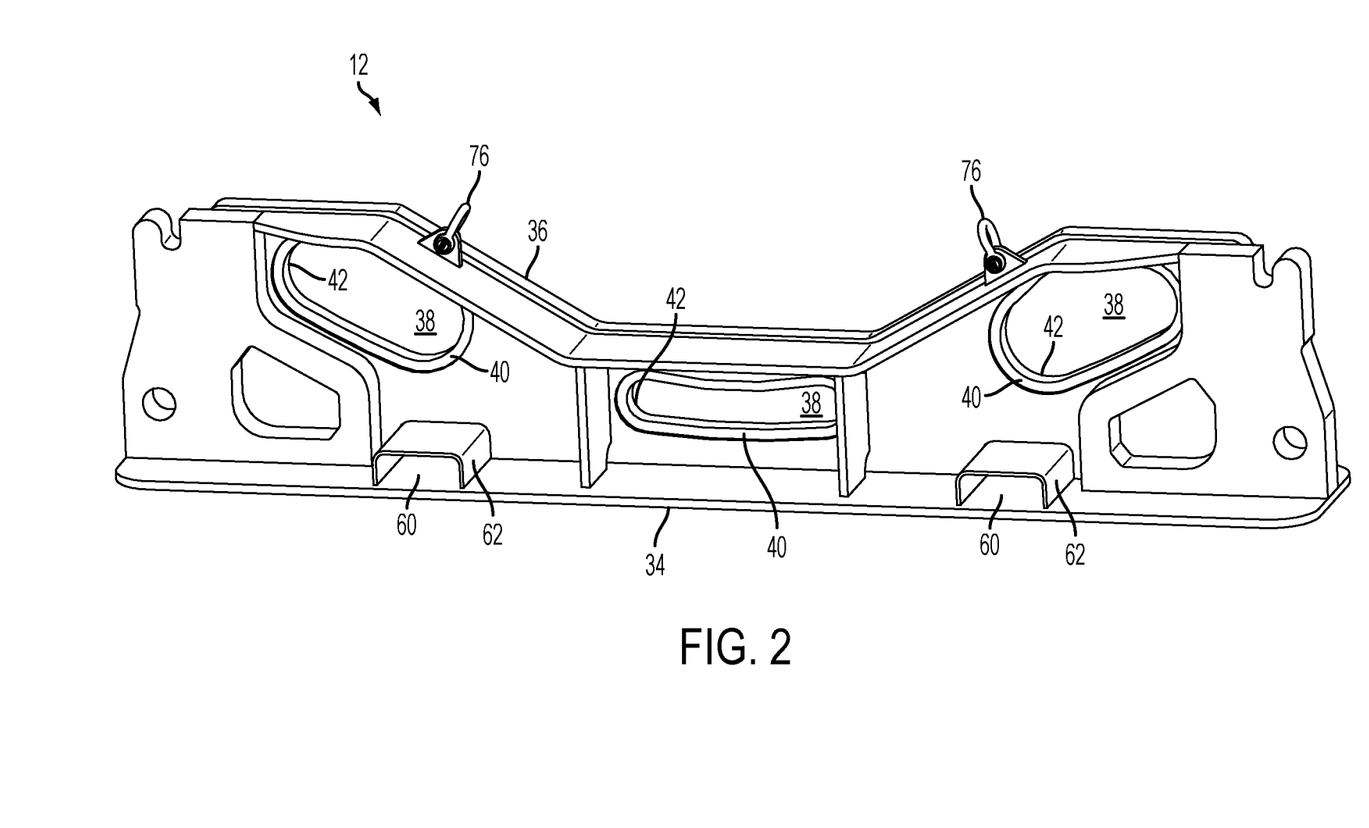
FIG. 2 is a perspective view of a fixture used in the system of FIG. 1.

Referring to FIG. 2, one of the fixtures 12 is shown. The fixtures 12 each have a base portion 34, an abutment portion 36 extending upwardly from the base portion 34, and a plurality of adaptor holes 38 extending through the abutment portion 36. The base portion 34 and abutment portion 36 are constructed from pieces of metal (e.g., steel) welded together to define the desired structure. Alternatively, the fixture 12 may be cast from a metal (e.g., iron) so that the base portion 34 and abutment portion 36 are formed together. Three adaptor holes 38 are shown in the abutment portion 36: a central adaptor hole and two outer adaptor holes. Each of the adaptor holes 38 has a recessed portion 40 on one side, thereby creating a shoulder or lip portion 42 on the opposite side.

Figure 3:
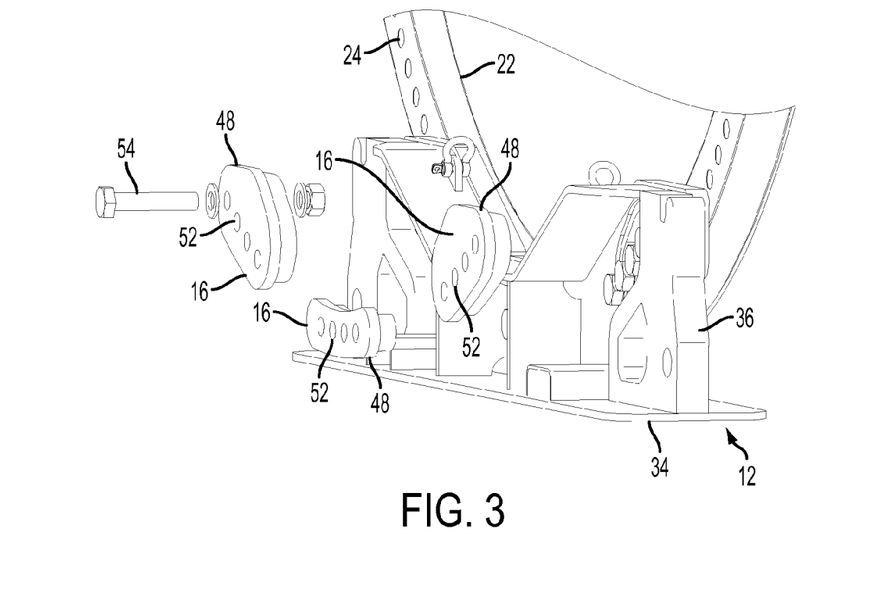
FIG. 3 is an enlarged view of one of the areas circled in FIG. 1.
Figure 4:
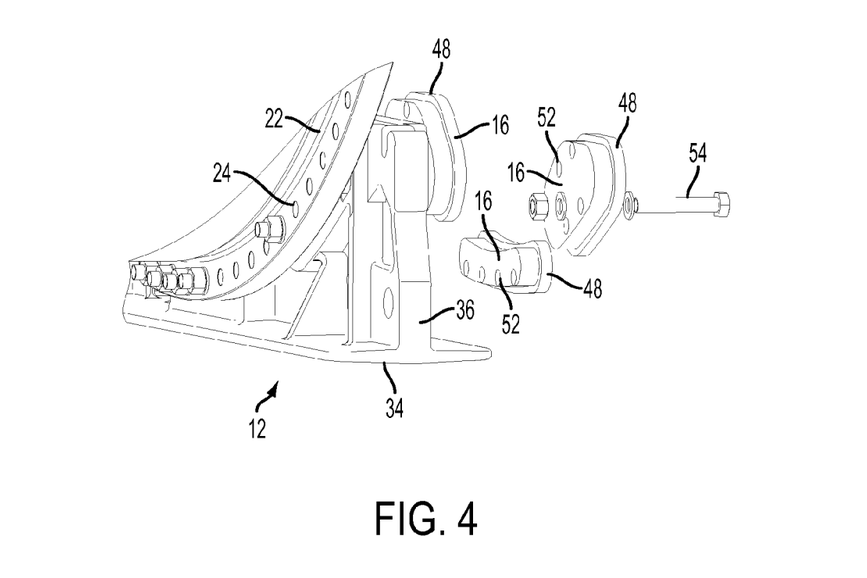
FIG. 4 is an enlarged view of the other area circled in FIG. 1.

As shown in FIGS. 2-4, the inserts 16 are positioned and retained within the adaptor holes 38. This may be achieved by designing the inserts 16 with geometry corresponding to the adaptor holes 38. In particular, the inserts 16 each have an enlarged portion 48 received in the recessed portion 40 of the corresponding adaptor hole 38. The shoulder portions 42 of the adaptor holes 38 then prevent the inserts 16 from being pushed or pulled through a side of the fixture 12 when positioned. The same effect may be achieved by designing the adaptor holes 38 and inserts 16 with other shapes, such as tapers. Alternatively or additionally, the inserts 16 may be retained within the adaptor holes 38 by separately securing them to the fixtures 12 with conventional fasteners (e.g., bolts, clamps, latches).

The inserts 16 each include one or more bolt holes 52 arranged along a radius of curvature corresponding to that of one of the flanges 22 (measured at the bolt holes 24) when the inserts 16 are positioned in the adaptor holes 38. Thus, the bolt holes 52 are arranged along the first or second radius of curvature mentioned above. The spacing of the bolt holes 52 also corresponds to the spacing of the bolt holes 24. This matching of curvature and spacing enables the bolt holes 52 to be aligned with the bolt holes 24 so that the fixtures 12 may be secured to the flanges 22 via bolts 54 extending through the inserts 16.

Accordingly, in use, the tower section 14 is positioned in a horizontal orientation using a crane or other conventional equipment for handling such components. A first fixture 12 is positioned against the first end 26 with the abutment portion 38 in contact with the flange 22 and the base portion 36 spaced from the flange 22. If not already performed, the inserts 16 with bolt holes 52 arranged along the first radius of curvature are positioned and retained in the adaptor holes 38. The fixture 12 is then secured to the tower section 14 by bolting the inserts 16 to the flange 22. If desired, these last few steps may be performed first (i.e., before positioning the tower section 14 horizontally). The process may also be repeated to secure a second fixture 12 to the second end 28 of the tower section 14, but by using the inserts 16 with bolt holes 52 arranged along the second radius of curvature.

As can be appreciated, the system 10 provides more than just an easy means of securing a fixture to a wind turbine tower section. The ability to accommodate different inserts 16 enables the system 10 to be used for various sizes of tower sections without significant reconfiguration. Indeed, the system 10 may include a plurality of inserts having similar shapes but with bolt holes arranged along different radii of curvature. Individuals handling tower sections may then select sets of inserts depending on the dimensions of the tower sections. Thus, the selected sets have bolt holes arranged along a radius of curvature corresponding to that of the bolt holes in the flange of the tower section to which they will be secured.

The design of the system 10 itself has additional benefits. In particular, the system 10 provides the above-described flexibility without having to incorporate adjustable locking elements in the fixtures 12. The result is a reliable, simplified construction that can be economically produced.

Furthermore, the components of the system 10 may be constructed to facilitate handling. For example, the fixtures 12 and inserts 16 may be constructed from materials with different densities. A heavier, stronger material may be used for the fixtures 12 because they are typically handled with the use of lifting equipment. On the other hand, a lighter material may be used for the inserts 16 so that they can be lifted and positioned by workers without additional equipment. In one specific embodiment, the fixtures 12 may be constructed from steel or iron while the inserts 16 may be constructed from aluminum. Using different materials for the fixtures 12 and inserts 16 enables the system 10 to be optimized for both performance (e.g., bearing loads) and handling.

Yet another advantage of the system 10 relates to how the fixtures 12 can serve as interfaces for other handling equipment. As shown in FIG. 2, the fixture 12 may incorporate slots 60 configured to receive forks of a forklift (not shown). One pair of slots 60 is illustrated, with each slot 60 extending through the abutment portion 38 immediately above the base portion 36. Additional framework 62 may be provided on the base portion 36 to increase the length of the slots 60. After the forks of a forklift are inserted through the slots 60, the forklift may be used to lift the fixture 12. This may be done when handling the fixture itself or when handling a tower section with the fixture (i.e., after the fixture 12 is secured to the tower section).

Figure 5:
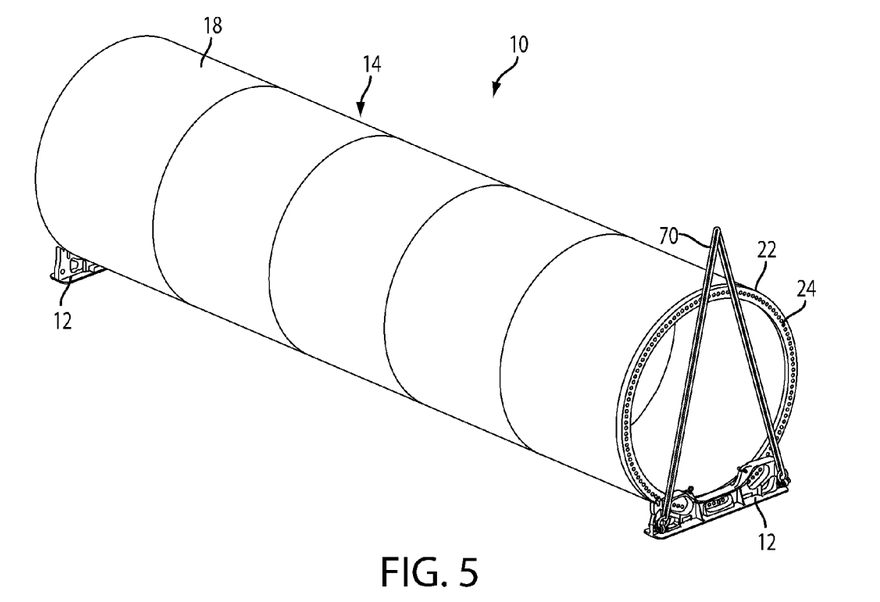
FIG. 5 is a perspective showing the system of FIG. 1 being used with lifting slings.
Figure 5A:
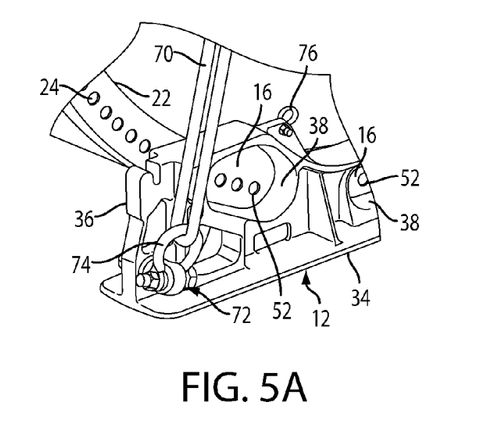
FIG. 5A is an enlarged view of the area circled in FIG. 5.
Figure 5B:
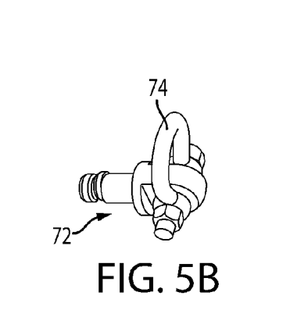
FIG. 5B is a perspective view showing a lifting bolt from FIGS. 5 and 5A in further detail.

FIGS. 5, 5A, and 5B illustrate one of the fixtures 12 being used with slings 70 (grommet slings in this particular example). The same reference numbers are used in the figures to refer to elements corresponding to those already discussed. To accommodate the slings 70, lifting bolts 72 are secured to the abutment portion 38 at different locations. The slings 70 are wrapped through loops 74 on the lifting bolts 72 and then hooked onto or otherwise secured to a lifting component (not shown), such as a hook of a crane. When the slings 70 are engaged with both the lifting bolts 72 and the lifting component, the first end 26 of the tower section 14 may be raised with the slings 70. Shackles 76 and/or other attachment devices may also be provided on the fixture 12 to facilitate handling with slings, ropes, chains, and the like when the fixture 12 is not secured to the tower section 14. The shackles 76 can also serve as lashing points so that the fixture 12 may be tied down to a trailer, railcar, vessel, or the like.

Figure 6:
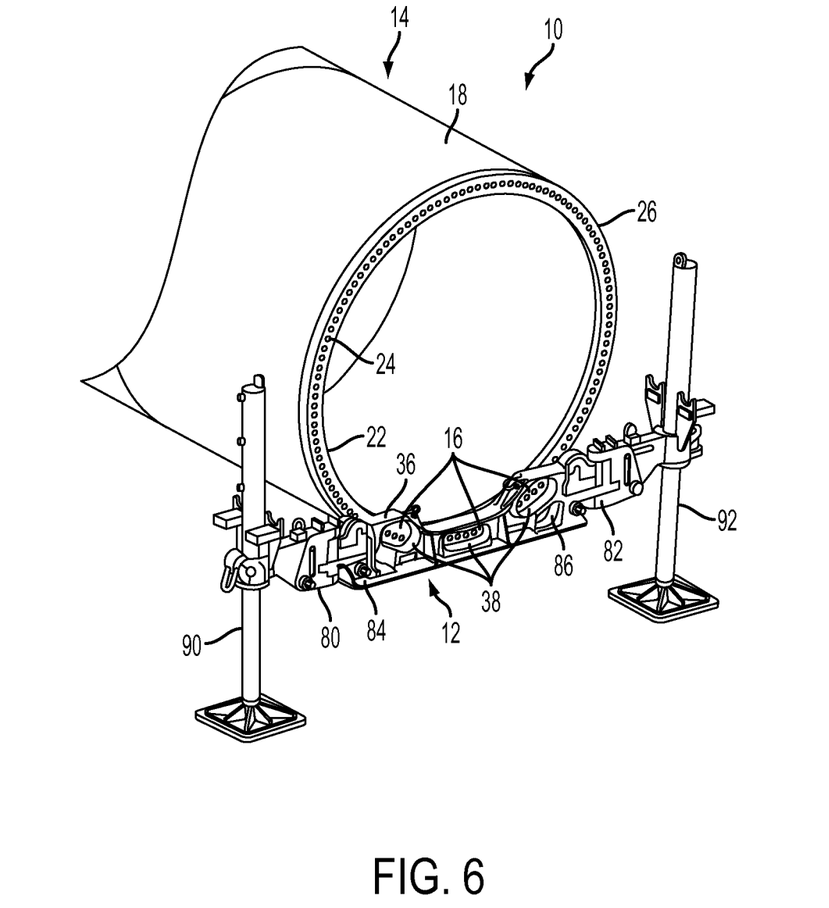
FIG. 6 is a perspective of showing a portion of the system of FIG. 1 being used as a jacking system.

In FIG. 6, the system 10 includes additional components to function as a "jacking" system. Only one of the fixtures 12 is shown, but the following description may equally apply to the other fixture on the end of the tower section that is not shown. With this in mind, the additional components are first and second brackets 80, 82 secured to first and second sides 84, 86 of the fixture 12. First and second lifting devices 90, 92 are secured to the respective first and second brackets 80, 82. The lifting devices 90, 92 each include hydraulic cylinders that may be operated to move the fixture 12 (and, therefore, the first end 26 of the tower section 14) vertically relative to the surface on which the fixture 12 was placed.

When both fixtures 12 include these jacking components, the first and second ends 26, 28 of the tower section 14 may be raised simultaneously. This may be particularly advantageous when loading or unloading the tower section 14 onto or from an elevated surface, such as the trailer of a truck. Indeed, the first and second brackets 80, 82 may be designed so that the space between the first and second lifting devices 90, 92 is greater than the width of the trailer. If loading onto the trailer, the tower section 14 may be raised until the trailer can be moved between the lifting devices 90, 92 and under the tower section 14, which is then lowered onto the trailer. These steps may occur in reverse when unloading the tower section 14. That is, the tower section 14 may be raised slightly above the trailer by the lifting devices 90, 92, allowing the trailer to be moved out from underneath the tower section 14 via the space between the lifting devices 90, 92. Thus, the tower section 14 may be loaded and unloaded without the use of cranes and other large, expensive lifting equipment. Similar operations may be performed with respect to railcars. Accordingly, as used herein, the term "trailer" refers to different types of movable carriages/vehicles.

The forklift, grommet slings, and jacking system mentioned above are merely examples of how the system 10 can accommodate different types of handling equipment and operations. Such flexibility reduces the number of times the fixtures 12 need to be secured to tower sections. Indeed, if desired, the fixtures 12 may be secured to tower sections at a factory and remain attached throughout all transportation and handling steps. All necessary operations can be performed without damaging or deforming the tower sections. The system 10 is able to maintain its functionality in all types of weather conditions. Advantageously, the fixtures 12 are secured in a way that still permits access into the tower sections if it is needed, but does not interfere with the placement of covers over the ends of the tower sections when access is not needed.

Figure 7:
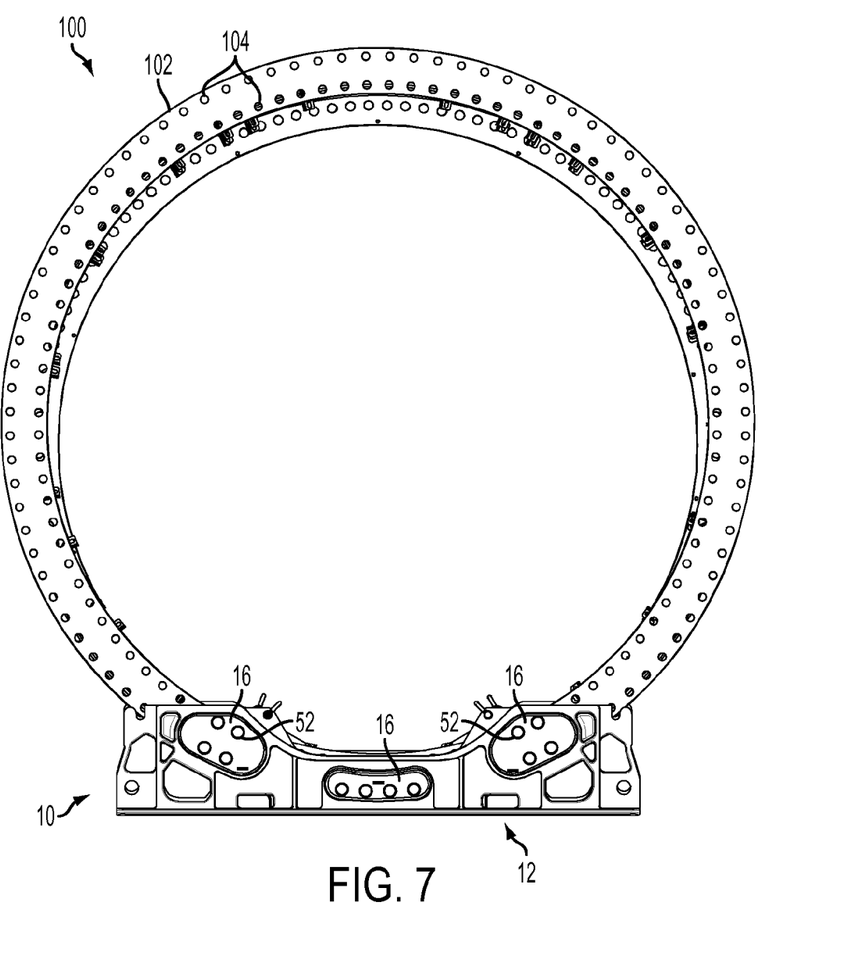
FIG. 7 is a front elevation view of another embodiment of a system for handling wind turbine towers.

Other examples, modifications, and advantages of the system 10 will be readily apparent to persons skilled in the handling of wind turbine components. For example, although the flanges 22 are shown as each including a single row of bolt holes 24, FIG. 7 shows how the system 10 may also be used to handle a tower section 100 with a flange 102 having two rows of bolt holes 104. A different set of the inserts 16 may simply be used. As shown, one or more of the inserts 16 may have two rows of bolt holes 52 with radii of curvature matching that of the bolt holes 104.

With this and other variations in mind, departures may be made from the details of the disclosed embodiments without departing from the invention defined by the claims below.

The invention claimed is:

1. A method for handling wind turbine towers, comprising:
   positioning a tower section in a horizontal orientation, the tower section having a first end with a flange and bolt holes through the flange arranged at a radius of curvature;
   positioning a first fixture against the first end of the tower section, the first fixture having a base portion, an abutment portion extending upwardly from the base portion and facing the first end of the tower section when positioned, and a plurality of adaptor holes extending through the abutment portion;
   providing a plurality of inserts comprising at least two different sets of inserts, each insert having at least one bolt hole and positionable within a corresponding adaptor hole in the first fixture, wherein inserts of different sets have similar shapes but are different in that the bolt holes are arranged along different radii of curvature when positioned in a corresponding adaptor hole;
   selecting a first set of inserts from the plurality of inserts such that when the first set of inserts is positioned in corresponding adaptor holes, the bolt holes define a first radius of curvature corresponding to the radius of curvature of bolt holes in the flange of the tower section;
   positioning and retaining the first set of inserts in the corresponding adaptor holes; and
   securing the first fixture to the first end of the tower section by bolting the inserts to the flange.

2. The method according to claim 1, wherein the first fixture is positioned against the first end of the tower section after positioning the tower section in a horizontal orientation.

3. The method according to claim 1, wherein inserts are positioned in the plurality of adaptor holes before positioning the first fixture against the first end of the tower section.

4. The method according to claim 1, wherein the first fixture is shaped to retain the inserts in the plurality of adaptor holes.

5. The method according to claim 1, further comprising:
   securing lifting bolts to the first fixture;
   engaging slings with the lifting bolts; and
   lifting the first end of the tower section with the slings.

6. The method according to claim 1, further comprising:
   inserting forks of a fork lift through slots provided in the first fixture; and
   lifting the first end of the tower section with the fork lift.

7. The method according to claim 1, further comprising:
   positioning a second fixture against a second end of the tower section, the second fixture having a similar construction as the first fixture, and the second end of the tower section having a flange with bolt holes;

positioning and retaining inserts in the plurality of adaptor holes in the second fixture; and securing the second fixture to the second end of the tower section by bolting the associated inserts to the flange of the second end.

8. The method according to claim 7, wherein the tower section is conical and the plurality of inserts used to secure the second fixture to the tower section include bolt holes arranged along a second radius of curvature different than the first radius of curvature.

9. The method according to claim 7, further comprising:

securing brackets to first and second sides of the first and second fixtures;

securing the brackets to respective lifting devices comprising hydraulic cylinders; and operating the lifting devices to raise the tower section while maintaining the horizontal orientation.

10. The method according to claim 9, further comprising:

moving a trailer under the tower section after the tower section has been raised via a space between the lifting devices associated with the first or second fixture; and operating the lifting devices to lower the first and second fixtures onto the trailer.

11. The method according to claim 9, further comprising:

loading the tower section onto a trailer after securing the first and second fixtures to the tower section; and after raising the tower section with the lifting devices, moving the trailer out from under the tower section via a space between the lifting devices associated with the first or second fixture.

12. The method according to claim 1, wherein each insert of the plurality of inserts is non-adjustably positionable within a corresponding adaptor hole.

13. A system for handling a wind turbine tower section having a first end with a flange and bolt holes through the flange arranged at a radius of curvature, the system comprising:

a fixture configured to support the first end of the tower section, the fixture having a base portion, an abutment portion extending upwardly from the base portion and configured to face the first end of the tower section, and a plurality of adaptor holes extending through the abutment portion; and a plurality of inserts comprising at least two different sets of inserts, each insert having at least one bolt hole and positionable within a corresponding adaptor hole in the fixture, wherein inserts of different sets have similar shapes but are different in that the bolt holes are arranged along different radii of curvature when positioned in a corresponding adaptor hole.

14. The system according to claim 13, wherein the adaptor holes in the fixture are shaped to prevent the inserts from passing through a face of the abutment portion.

15. The system according claim 14, wherein the adaptor holes have a recessed portion configured to face away from the first end of the tower section, the inserts each having an enlarged portion received in the recessed portion of the corresponding adaptor hole.

16. The system according to claim 13, wherein the fixture comprises a first material having a first density and the plurality of inserts comprise a second material having a second density less than the first density.

17. The system according to claim 16, wherein the fixture comprises steel or iron and the plurality of inserts comprise aluminum.

18. A system according to claim 13, further comprising:

first and second brackets secured to first and second sides of the fixture; and first and second lifting devices secured to the first and second brackets, respectively;

wherein the first and second lifting devices each include respective hydraulic cylinders configured to move the fixture vertically relative to a horizontal surface.

19. The system according to claim 13, further comprising: a wind turbine tower section having a first end with a flange extending along a first radius of curvature and bolt holes through the flange.

20. The system according to claim 13, wherein each insert of the plurality of inserts is non-adjustably positionable within a corresponding adaptor hole.

* * * * *